US008161598B2

(12) United States Patent
Black et al.

(10) Patent No.: US 8,161,598 B2
(45) Date of Patent: Apr. 24, 2012

(54) FILTERING MEANS AND FLOOR-SWEEPING MACHINE PROVIDED WITH SUCH MEANS

(75) Inventors: John Black, Tyndall, SD (US); Primo Granata, Lodi (IT)

(73) Assignee: Nilfisk-Advance SpA, Lodi (IT)

( * ) Notice: Subject to any disclaimer, the term of this patent is extended or adjusted under 35 U.S.C. 154(b) by 444 days.

(21) Appl. No.: 12/428,650

(22) Filed: Apr. 23, 2009

(65) Prior Publication Data

US 2009/0282641 A1 Nov. 19, 2009

(30) Foreign Application Priority Data

May 16, 2008 (IT) .............. PN2008A0037

(51) Int. Cl.
- *A47L 9/10* (2006.01)
- *A47L 9/20* (2006.01)
- *B01D 41/00* (2006.01)

(52) U.S. Cl. .......................... 15/352; 55/300
(58) Field of Classification Search .............. 15/352; 55/300, 293, 304, 305; 210/106, 107
See application file for complete search history.

(56) References Cited

U.S. PATENT DOCUMENTS

| | | | | |
|---|---|---|---|---|
| 4,258,451 A | * | 3/1981 | Sommerfeld | 15/352 |
| 4,328,014 A | * | 5/1982 | Burgoon et al. | 55/300 |
| 5,013,333 A | * | 5/1991 | Beaufoy et al. | 95/20 |
| 5,194,077 A | * | 3/1993 | Bargiel et al. | 55/300 |
| 7,040,039 B1 | | 5/2006 | Stein et al. | |
| 2007/0226953 A1 | | 10/2007 | Ohtsu et al. | |

FOREIGN PATENT DOCUMENTS

| | | |
|---|---|---|
| DE | 34 38 575 | 4/1986 |
| DE | 296 20 412 | 2/1997 |
| EP | 1 776 912 | 4/2007 |
| GB | 2 428 559 | 2/2007 |
| JP | 2006-81634 | 3/2006 |
| JP | 2007-125294 | 5/2007 |
| JP | 2007-260037 | 10/2007 |
| JP | 2007-268120 | 10/2007 |
| JP | 2007-296050 | 11/2007 |
| WO | 2007/031497 | 3/2007 |

* cited by examiner

*Primary Examiner* — Bryan R Muller
(74) *Attorney, Agent, or Firm* — Wenderoth, Lind & Ponack, L.L.P.

(57) ABSTRACT

A filtering device filters out impurities contained in an air stream, and includes an inner filter plate, an outer frame that houses said filter plate thereinside, a structure for retaining said filter plate and conveying the shaking motion, a support socle applied on to said structure, a rotary electric motor, whose rotor is provided with one or more unbalanced masses, and which is fixedly mounted on said socle. The electric motor is operated in an intermittent manner, preferably with a direct-current, substantially square-wave supply voltage according to an ON-OFF cycling pattern, so as to generate a very broad spectrum of shaking frequencies that proves more effective in enabling impurities to be removed from the filter plate.

9 Claims, 14 Drawing Sheets

FILTERING MEANS AND FLOOR-SWEEPING MACHINE PROVIDED WITH SUCH MEANS

BACKGROUND OF THE INVENTION (1) Field of the Invention

The present invention refers to an improved kind of floor cleaning and sweeping machine, as well as to a filtering arrangement for an air stream being sucked in and re-circulated in the surrounding environment, mounted on and used by such machine.

(2) Description of Related Art

Floor cleaning and sweeping machines, in particular such machines intended for industrial application, which are generally used to sweep and clean very large floor surfaces subject to considerable soiling, are largely known to be based mainly on:

the creation—in a position close to the floor to be cleaned—of an almost sealed, i.e. air-tight suction or vacuuming chamber;

the suction of the air being taken into said chamber, in which there are contained the soil particles to be removed; and a filtering process, which said air being so sucked in is due to undergo, as carried out with the aid of an appropriate filtering element, which is usually provided in the form of a filter plate or sieve of a type generally known as such in the art, duly delimited and sustained by a suitable support structure.

Largely known in the art is also the need for said filtering element to be periodically cleaned to prevent clogging which jeopardizes the entire cleaning process and, as a result, the effectiveness thereof.

According to the prior art, owing to said filtering element being rather large in the overall size thereof and being further subject to clogging rather frequently, a replacement of the complete filter cartridge or filter plate—as this is usually done in other sectors, such as for instance in the case of air filters used in road haulage vehicles in general and in passenger motor-cars—proves practically quite expensive on the whole, in terms of both machine downtime and direct costs.

As a result, a common practice has been establishing in the specific sector, based on providing means for the same filter to be able to periodically undergo a vigorous cleaning process as brought about through a shaking action imparted to the filter, wherein said shaking occurs in particular in a rotatorily variable direction.

The above-mentioned shaking action is obtained by applying a light-weight support frame onto a face of the filter plate, and linking to said frame a rotary electric motor, whose rotor is rigidly connected with one or more weights that are sensibly eccentric relative to the axis of rotation of said rotor.

When such motor is switched on, it is allowed or caused to operate at a constant speed, so that the eccentric load placed on the rotor thereof gives of course rise to an alternating variable-direction mechanical impelling force, which is obviously transferred—via bearings or other similar or equivalent means—on to the respective stator and—from such stator—further on to said support structure and, as a result, ultimately to the entire body of the filter plate. In this way, the filter plate is therefore stressed mechanically by an alternating impelling force that acts in a rotary manner, but in all cases in planes that extend orthogonally to the main plane of the filter plate, wherein the latter is of course orthogonal to the direction of the air stream to be filtered.

As a result, said motor is therefore operated periodically—and whenever this proves necessary or may be considered appropriate—to bring about a vigorous shaking action on the filter plate and, ultimately, almost totally remove the dust and dirt particles retained by and collected onto the same filter plate, thereby restoring the operating efficiency thereof.

What has been explained above belongs to the prior art and—as such—is largely known to all those skilled in the art, so that it shall be appreciated as having been recalled here for the purpose of facilitating the reader in more readily understanding the actual scope of the present invention.

Additionally, in other sectors of industry and technique in general, the cleaning process for an air or gas filter in general is usually carried out by submitting the related filter plate to a mechanical vibrating action performed in a more or less automatic manner.

Known from the patent DE 3438575 A1 there is in fact an arrangement for periodically cleaning the lint filter of a drying machine, such as in particular a clothes drying machine, which is adapted to submit said filter to a vibratory effect of such frequency and extent as to cause the lint and the other particles that are retained by said filter to be released from the filter plate or cartridge to then collect by gravity into an appropriate container provided under said filter plate.

The vibratory effect acting on said filter element is generated by an appropriate electrically operated device that is adapted to produce a mechanical oscillation on a member thereof that is connected to said filter plate so as to be able to transmit the thus generated vibrations thereto.

Such solution, although not inherently novel, proves effective and is easily embodied. However, it has a major drawback in that the oscillations are generated at a fixed frequency, so that the actual effectiveness thereof is practically limited to those dirt particles settling onto the filter plate, which are mostly stressed, i.e. most liable to be affected by such frequency, and, therefore, in particular to those dirt particles that, as combined with the portion of filter plate which they are settled upon, have an oscillatory eigenfrequency, i.e. a natural oscillation frequency that is similar or even equal to the stressing frequency of said vibrating arrangement.

As a natural result of such circumstance, what is obtained with an arrangement as the above-described one, actually, is just a partial cleaning effect on the filter element, so that it can be most readily appreciated that, in the case of the floor-cleaning machine being used through extended periods of time, the need unavoidably arises for specific maintenance actions to be taken manually on the filter element in view of ensuring a continued efficiency thereof, i.e. a circumstance that is in all cases quite undesired in an industrial environment, where a primary goal is achieving as high as possible competitiveness levels under as great as possible a reduction in costs of any kind whatsoever.

Known from the disclosure in the patent publication DE 29620412 U1 is a clothes drying machine, which is provided with a filter plate, or cartridge, that is mechanically linked with means for generating a mechanical vibratory action, wherein the thus generated vibrations are applied in a direction extending orthogonally to the filter plate, which is in turn made in the form of a planar element arranged in a vertical position.

The solution described in the above-cited publication, although representing an improvement from the general point of view of a clothes drying machine, does however not constitute or show any substantial difference from the solution set forth in the formerly cited patent, since the filter plate is even in this case caused to vibrate, although at definite intervals, at an anyway constant frequency, so that the same practical drawbacks ultimately arise.

Cleaning the filter element by subjecting it to a periodical shaking action has generally proved effective, as well as simple to implement. However, it has been found—also on an experimental basis—that, in the case of particularly dusty environments or quite intensive uses of the filter-containing machine, cleaning the filter by solely subjecting it to an action of mechanical shaking, as this has just been explained, is by no way always sufficient, since there may have been sucked in, or taken in, particular kinds of dust that, due to the particular nature thereof, tend to cling to the filter plate in a particularly tenacious manner, so that a much more effective shaking action would be needed on the filter element, actually, to achieve adequate filter cleaning results.

In particular, known in the industrial floor-cleaning sector is a number of solutions that are generally based on shaking or vibrating the filter in view of generally cleaning it through a removal of collected dust and dirt particles, wherein such shaking or vibrating of the filter is brought about by submitting the same filter to stresses induced at a constant frequency.

For the record, following patent publications may be cited in this connection:
JP 2007296050 A2,
JP 2007268120 A2,
JP 2007260037 A2,
US 20070226953 A1,
JP 2007125294 A2,
EP 1776912 A2,
WO 07031497 A1,
JP 2006081634 A2,
GB 2428559 A1.

On the other hand, providing means capable of ensuring a particularly intensive, vigorous shaking action, as obtained with the aid of a motor having a rotor coupled to eccentric masses, which therefore are unbalancing in the dynamical behaviour thereof, clearly clashes with definite mechanical and construction constraints and limitations as far as not only the construction of the vibrating motor, but also the construction of the same filter plate and the related support frame is concerned.

Such constraints and limitations are easily identifiable by all those skilled in the art and, owing also to them not being any relevant matter as far as the present invention is concerned, shall for the sake of brevity not be explained any further.

As far as the use of a variable frequency in connection with an air filter and the cleaning thereof is concerned, known from the disclosure in the U.S. Pat. No. 7,040,039 is a solution aimed at detecting the degree of cleanliness of a filter by simply measuring the resonance eigenfrequency thereof under fully clean conditions, then measuring the resonance frequency thereof also after its use or at particular or pre-established intervals, and finally assessing the difference, i.e. the deviation of the two resonance frequencies from each other; should such deviation turn out as being greater than a pre-determined value, the filter is considered as being sufficiently soiled (the variation in the resonance frequency having of course been brought about by the soil settled onto the filter plate) and, as a result, requiring specific action to be taken in view of removing such soil and restoring filter efficiency.

On the other hand, neither such patent includes any teaching regarding the means for generating and the utilization modes of a shaking action—either at a fixed or a variable frequency—to the purpose of cleaning the filter plate.

BRIEF SUMMARY OF THE INVENTION

It is therefore be desirable, and it is a main object of the present invention, actually, to provide an improved gas filter, and a floor-cleaning machine that uses such filter, which is provided with operating means and features operating modes that are adapted to perform filter cleaning either periodically or at pre-established intervals, and that, by applying a shaking action, prove particularly effective in ensuring cleaning, while avoiding submitting the filter plate to any anomalous stress as compared with what is typically done in the prior art.

Within this general object, it is a purpose of the present invention to provide a filter that makes substantially use of sole component parts that are already been used in the particular industry and are anyway readily and freely available on the market, without any need arising for new apparatus to be designed and developed, except of course for the normal arrangement required for the mounted parts to be mechanically and operatively coupled with each other accordingly.

A further purpose of the present invention is to provide an improved support means or structure, by means of which the rotary motor can be suitably coupled to the filter plate so as to optimize the cleaning performance thereof.

According to the present invention, these aims are reached in a filter means and a machine using such filter means, which incorporate the features and characteristics as defined and recited in the appended claims.

BRIEF DESCRIPTION OF THE DRAWINGS

Advantages and features of the present invention will be more readily understood from the description that is given below by way of non-limiting example with reference to the accompanying drawings, in which.

DETAILED DESCRIPTION OF THE INVENTION

Figure 1:
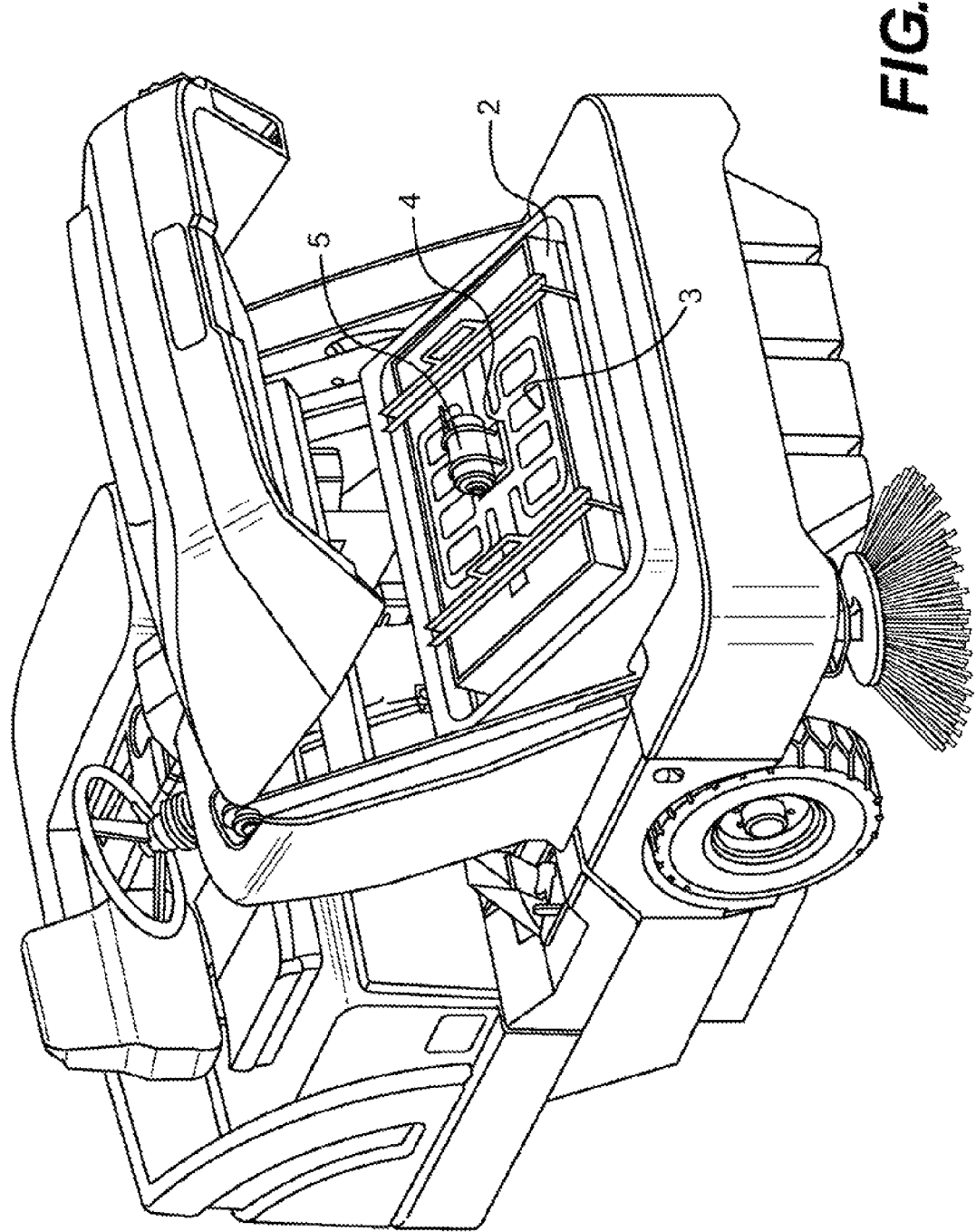
FIG. 1 is a perspective view of a floor-cleaning machine that uses a filter.
Figure 2:
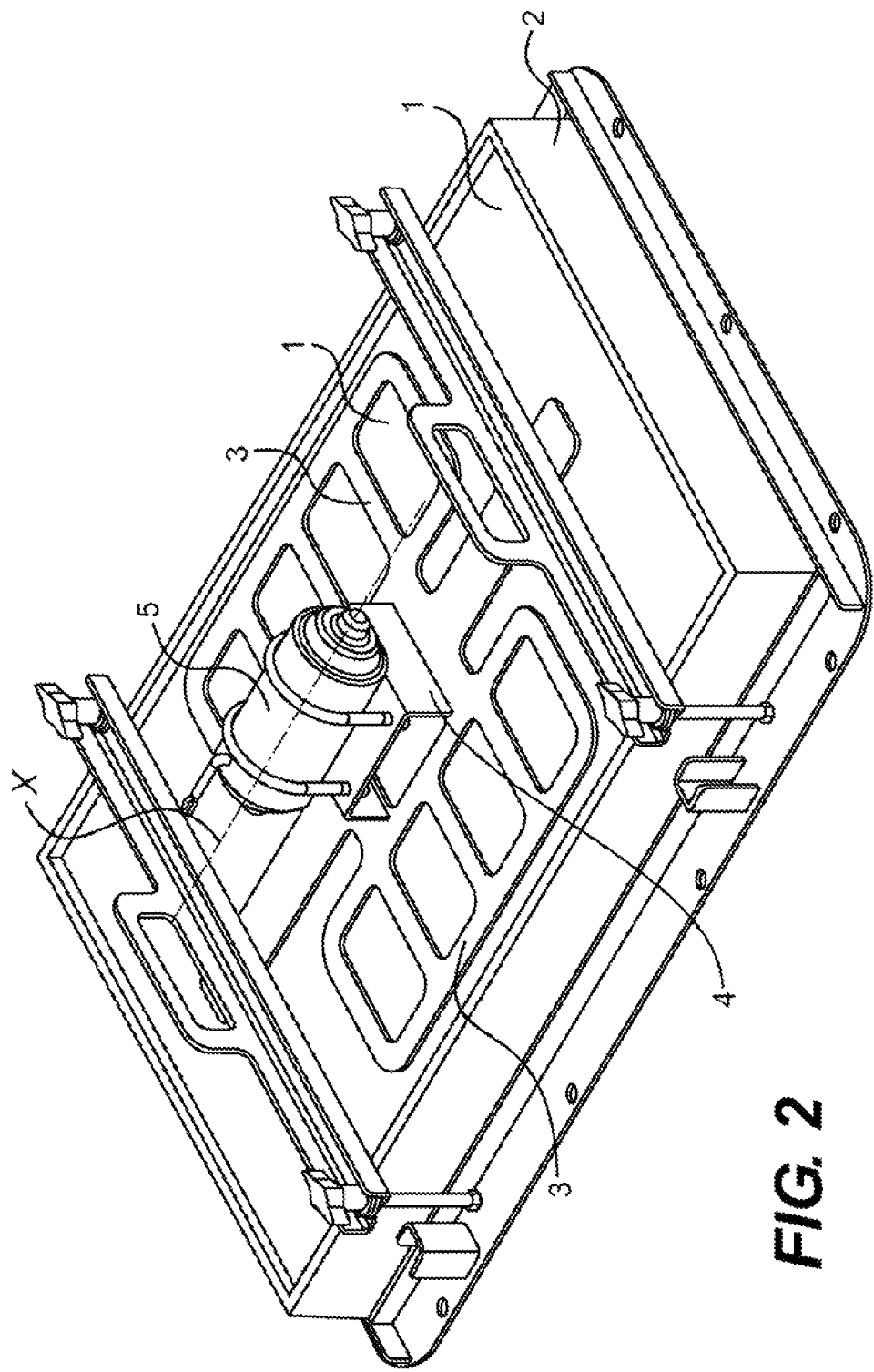
FIG. 2 is a perspective view of a detail of the filter means shown in FIG. 1.
Figure 3:
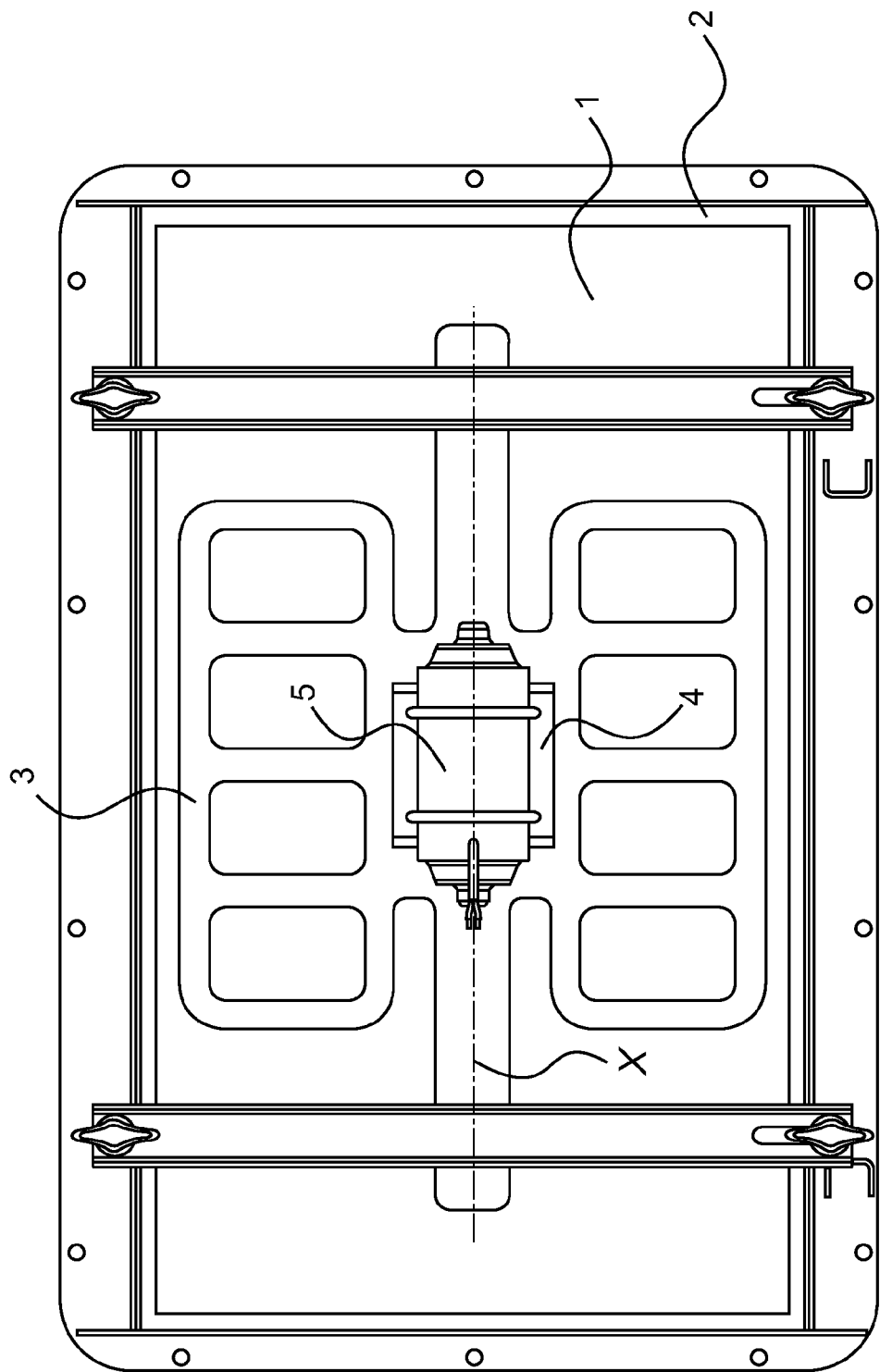
FIG. 3 is a front planar view of the filter means shown in FIG. 2.

With reference to the above-noted Figures, an arrangement for filtering out the impurities contained in an air stream flowing through said filter means comprises:

an inner filter plate 1, an outer frame 2 for holding and accommodating said filter plate 1 therewithin, a planar structure 3 adapted to retain said filter plate 1 within said frame 2, as well as to convey a shaking motion towards and against said filter plate 1, said planar structure being placed upon a face of said filter plate, a support socle 4 applied upon said planar structure 3, a rotary electric motor 5, whose rotor is applied on to a respective rotating shaft, to which there are firmly joined one or more eccentric and, therefore, unbalancing masses, which are largely known as such in the art, so that they are not specifically shown in the Figures.

Said motor is mounted with its stator on said support socle 4, obviously on the opposite side thereof with respect to the filter plate 1; the latter is made in a manner as generally known as such in the art by making use of a sheet of paper, tissue or cloth, possibly treated or impregnated, as well as pleated in the manner of the bellows of an accordion so as to increase the surface area being exposed to and hit by the flow of the air to be filtered to as remarkable an extent as possible.

As known in the art, giving a filter plate such pleated configuration in the form of the bellows of an accordion enables a twofold advantage to be achieved in terms of a larger filtering surface, which in turn is effective in slowing down the aggregation rate of both dust and dirt particles thereupon, thereby allowing for filter cleaning operations to be performed less frequently, and a smaller air-pressure drop.

At this point, it appears to be adequate for the logics behind the operation, or working mode, of the present invention to be explained in a technically complete manner. To begin with, it may be recalled here that, in a filtering means according to the prior art, a motor with unbalanced axial loads is driven to rotate at a constant rotating speed.

Therefore, each time that the rotor shaft completes a turn, also the unbalanced load is rotated by a same turn in a synchronous manner, so that it creates a centrifugal force that is constant in its amplitude, but variable in its direction, which rotates at a constant angular speed on a plane that is orthogonal to the axis of rotation X of the rotor.

This centrifugal force is transmitted in the way of an equivalent stress being exerted by said rotor upon the stator, typically via bearings or other similar means; from the stator, such stress is then transmitted on to the socle 4 that in turn transfers it to said planar support structure 3, from which said stress is ultimately transmitted to the filter plate 1.

Figure 8:
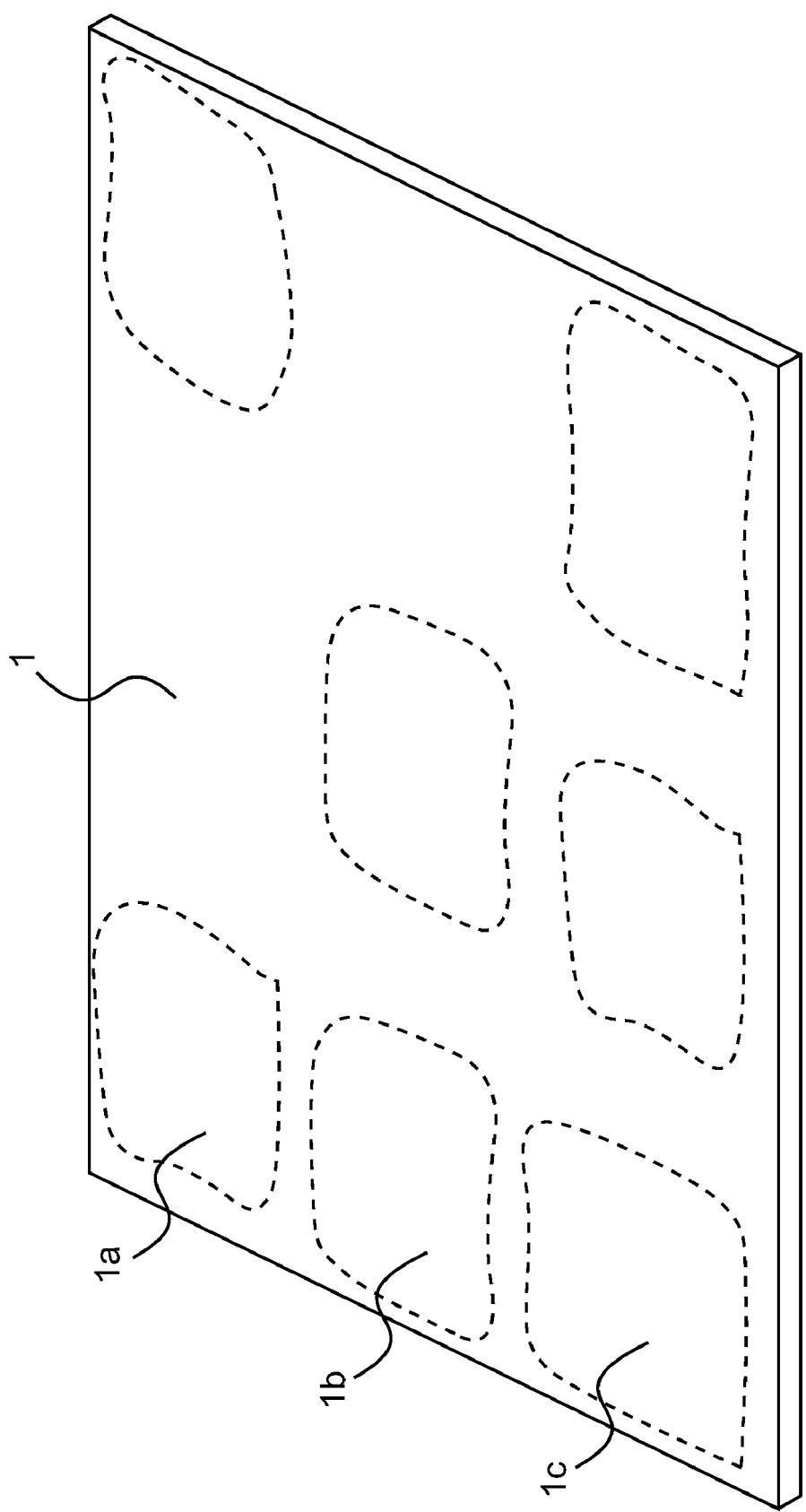
FIG. 8 is a symbolical representation of the composition of a filter plate according to the present invention.

The filter plate 1 itself may be figuratively and ideally subdivided into a multiplicity of elementary portions $1a$, $1b$, $1c$, ... as symbolically shown in FIG. 8.

Each one of these portions might even be such as to be roughly similar, if not even equal—as far as both the composition and the geometry thereof are concerned—to all other thus defined portions; however, as far as the vibrations induced by said planar support structure 3 are concerned, each one of such portions reacts in a different manner, since the conditions of mechanical coupling to the contour of each one of said portions $1a$, $1b$, $1c$, ... are usually different from the conditions of mechanical coupling to the contour of another, albeit contiguous portion comprised within the same filter plate 1.

In practice, each single portion has an oscillation eigenfrequency that is different from the oscillation eigenfrequency of respective other portions, regardless of them being located contiguously thereto or not.

Since in prior-art solutions the rotation frequency, i.e. rate of the shaft with the eccentric masses is constant, by means of a simple mechanical coupling the oscillation having such frequency is then able to be passed on as a synchronous oscillation to all said portions of the filter plate 1, even if—as mentioned above—the related eigenfrequencies differ from said rotation frequency of the shaft with the eccentric masses.

However, just owing to the fact that:

said oscillation eigenfrequencies are normally different—even in a remarkable manner—from the rotation frequency of said shaft, and the kind of oscillation induced by said shaft on said filter plate 1 is a sensibly sine-wave oscillation (although slightly modified by the presence of said planar structure 3 featuring a generally elastic behaviour), each one of said portions $1a$, $1b$, $1c$, ... is ultimately driven, i.e. affected solely by the frequency of rotation of the shaft and not, on the contrary, by other frequencies which, owing to them lying closer to the respective eigenfrequencies, would by the way promote a resonant oscillation, which in other words would be much larger and, as a result, extremely more effective from the point of view of the cleaning action on each one of said portions $1a$, $1b$, $1c$, ..., which, when put together, make up said filter plate 1.

Figure 6:
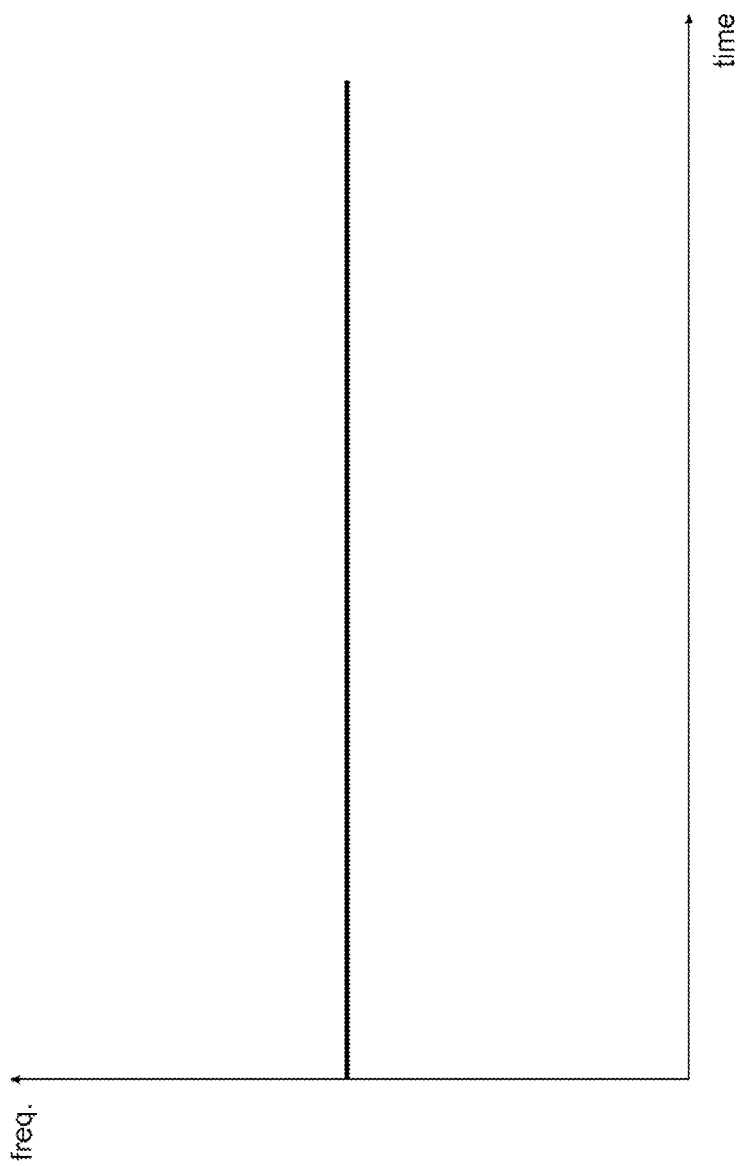
FIG. 6 is a symbolical, diagrammatical representation of the operative mode of a filter means according to the prior art.
Figure 9:
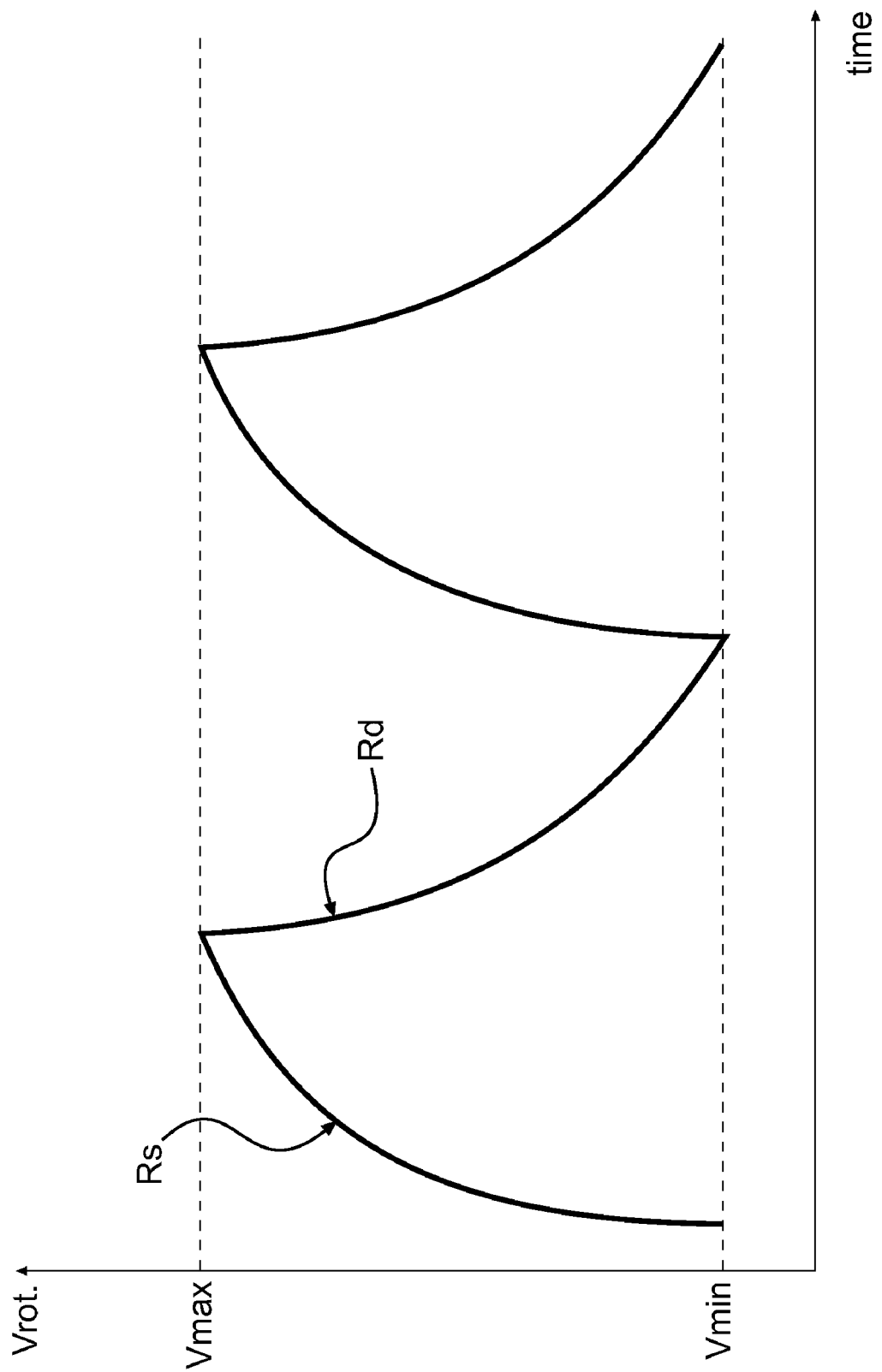
FIG. 9 is a diagrammatical representation of the speed of rotation, or rpm, of the shaft of the filter shaking motor versus time, according to the present invention.

In an attempt to overcome such limitation, the present invention provides for said electric motor 5 to be operated so as to rotate not at a constant speed, as shown in FIG. 6, but rather at a speed that is caused to continuously vary versus time between two extreme values Vmax and Vmin thereof, as exemplarily illustrated in FIG. 9 (such values are of course referred to the angular speed of the rotating shaft of the electric motor 5, and not to any displacement speed in space whatsoever).

This solution has in fact a distinct advantage in that, in the first place, there is generated an oscillation, whose frequency—owing to its being variable—spans a band of frequencies that may even be quite broad; as a result, it turns out as being much more likely for some of such frequencies, such as for instance the frequencies f1, or f2, or f3 ... to be identical or very close to the natural free oscillation frequencies, or eigenfrequencies, of said portions $1a$, $1b$, $1c$ ... ; and, in all cases, providing a variation in the oscillation frequency induced by the motor is effective in causing the frequency of the oscillation imparted by the rotating shaft to approach—at certain instants—some of the natural frequencies, i.e. eigenfrequencies of respective ones of said portions of the filter plate 1.

An obvious, fully appreciable result of the provision set forth above is the fact that, even if the oscillation frequency being induced fails to adequately approach said eigenfrequencies, so that there does not occur any real resonance, actually, said portions $1a$, $1b$, $1c$ ... of the filter plate 1 are in any case submitted to a stress, i.e. a force that is generally much more vigorous than the one they would be exposed to if submitted to a stress at a fixed frequency.

Anyway, the most conspicuous advantage is not solely achieved owing to the fact of varying the rotation frequency of the motor, but also, and mainly, owing to the fact that the sole variation in the frequency of the mechanical stress induced by the rotating shaft is effective in generating a very advantageous multiplicity of harmonic frequencies; in fact, the variation in the angular rotation speed of the rotating shaft generates a kind of stress that—as this has been exhaustively demonstrated by experimental data—has no longer a sensibly sine-wave form, but follows rather a more irregular pattern owing exactly to the fact that an angular acceleration is superposed to, i.e. laid over the instantaneous angular rotation speed, wherein this is on the contrary fully absent in filtering means that use motors with unbalancing shafts according to the prior art, owing to the speed of rotation thereof is by all means constant.

Such irregular pattern of the main stress then transforms into a plurality of stresses at harmonic frequencies, or shortly harmonic stresses, being generated therefrom, the properties and effects of which are on the other hand largely known in the art.

These harmonic stresses being in this way generated by such rotation at a continuously variable rotation speed of the rotor shaft are most apparently such as to span a band of frequencies, the amplitude of which is normally very broad, so that they prove effective in stressing each one of said portions of the filter plate with all of the harmonic frequencies being generated.

It can therefore be most readily appreciated that, since the natural free oscillation frequencies, or eigenfrequencies, of said portions are rather high, and certainly much higher than the basic or fundamental frequency of said rotor, the circumstance is much more likely to occur that the harmonic stresses being generated and passed on to the filter plate 1 will have frequencies that are similar, if not even identical to the natural free oscillation frequencies f1, f2, f3 of said individual portions 1a, 1b, 1c. . . .

Accordingly, said portions are not solely stressed by the fundamental, although variable frequency of rotation of the rotor shaft, i.e. a circumstance that is by itself effective in increasing the possibilities for them to experience greater and stronger oscillations, but are also—and above all—affected by the various harmonic stresses, i.e. a circumstance that is again effective in increasing the amplitude of the overall oscillation thereof to a still further extent.

The ultimate result of what has been set forth above is a shaking or vibrating action on each one of the portions making up said filter plate, which spans a very broad band of oscillation frequencies, much broader than the oscillation band corresponding to the range of the sole variation in the speed of rotation of the unbalanced shaft, actually, under a dramatic increase in the vigorousness of the resulting stress and, therefore, of the cleaning effect of each single one of said portions of the filter plate 1.

The above-described filter means is then installed in a floor cleaning or sweeping machine generally known as such in the art, thereby sensibly improving such machine in the self-cleaning effectiveness of the filter means thereof and, ultimately, in the overall economic value thereof thanks to reduced maintenance requirements for cleaning and replacing the same filter.

The present invention, as described above, is any way such as to allow for a number of further advantageous improvements and embodiments.

1) A first one of such improvements relates to the mode in which the rotation speed of said unbalanced shaft is varied, actually. With particular reference to FIG. 9, it has both experimentally and practically been found that an optimum solution is obtained when the motor imparts a rotation to the shaft, which is continuously increasing from said minimum speed Vmin to said maximum speed Vmax, i.e. a speed runup curve Rs increasing from Vmin up to Vmax is initiated in the first place, as followed then by a continuous speed rundown curve Rd decreasing from Vmax down to Vmin.

Figure 10:
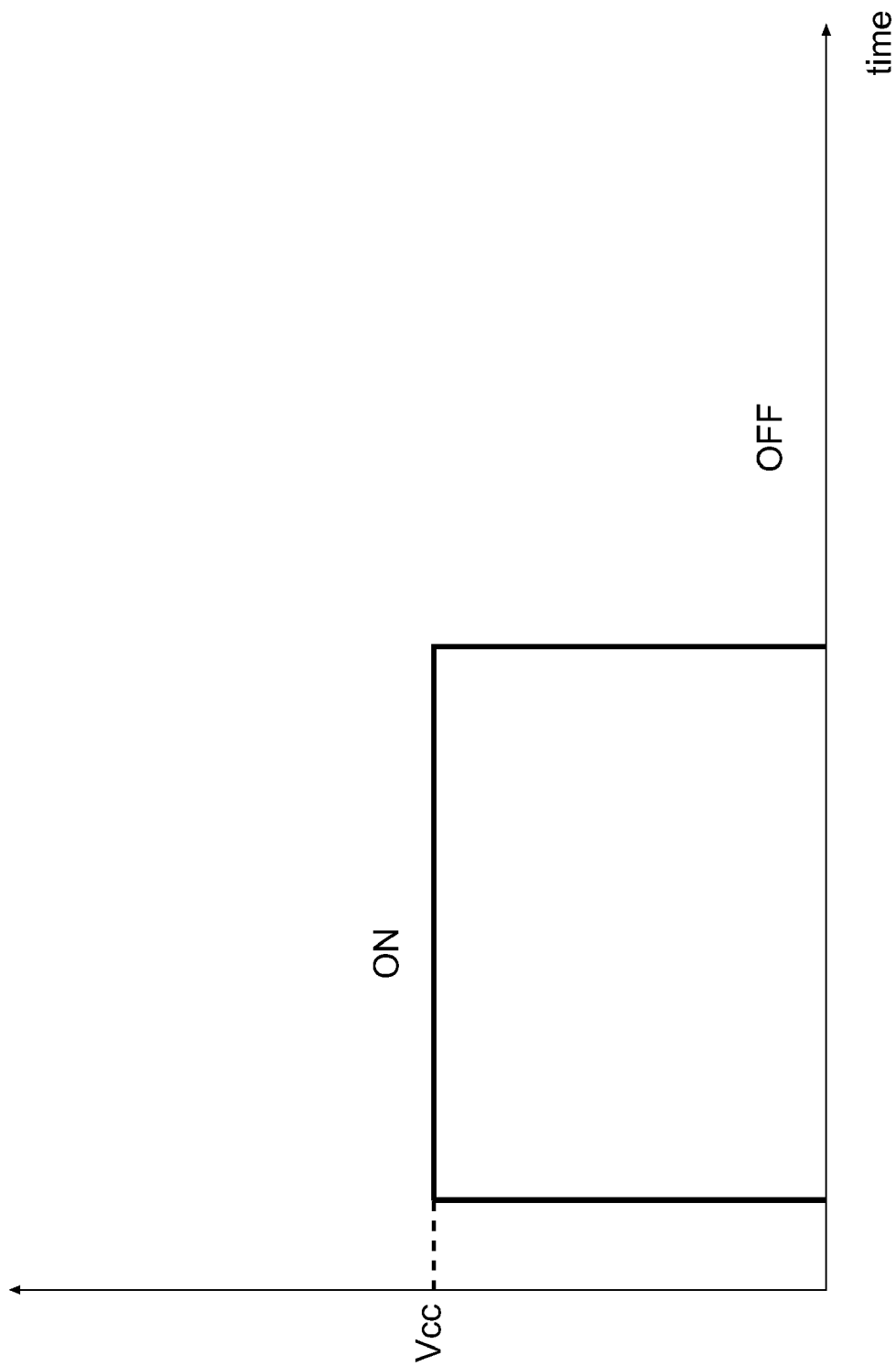
FIG. 10 is a diagrammatical representation of the power supply pattern to the shaking motor according to the present invention.

Such behaviour, i.e. pattern of the angular rotation speed of the unbalancing shaft can be obtained with both various kinds of motor used and various modes and systems for controlling the power supply. It has however been experimentally found that a most effective, simplest possible embodiment in this connection is provided by making use of a normal direct-current motor of the kind that is currently used in general to the same purpose as supplied with a constant intermittent direct voltage, wherein according to the present invention such motor is on the contrary supplied with an intermittent direct voltage. In other words, according to the present invention, the motor is in this case supplied for a short period with a constant rated voltage Vcc, whereas such supply is completely interrupted during another short period following the previous one. In practice, such motor is supplied with a direct voltage in an ON-OFF cycling mode, as this is symbolically represented in FIG. 10.

Figure 11:
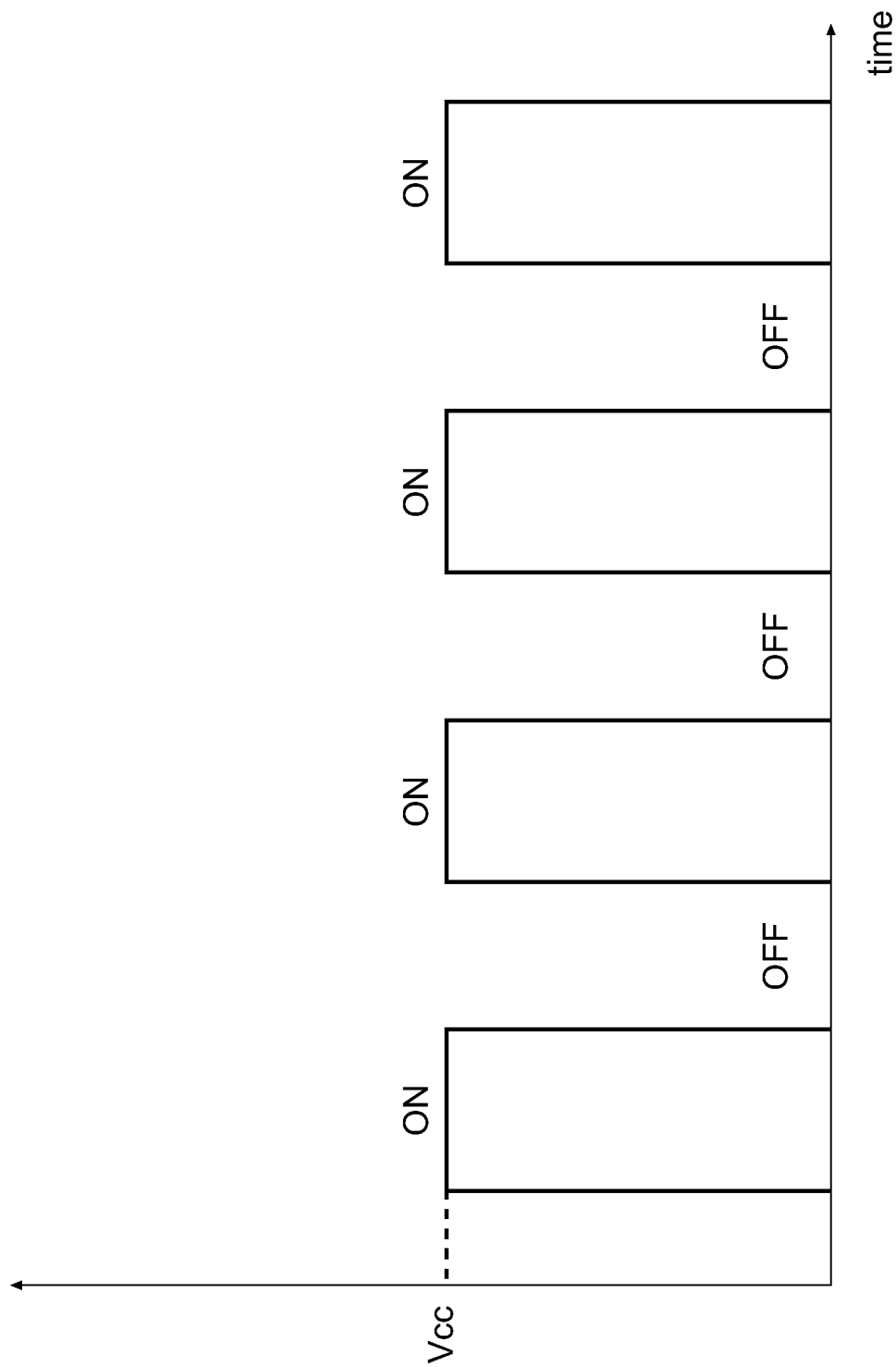
FIG. 11 is a diagrammatical representation of an improved power supply pattern over the one illustrated in FIG. 10.

2) It has also been found and noticed that best effectiveness in cleaning the filter plate is obtained if the above-mentioned cleaning cycle is repeated in a sequence a certain number of times, as this is exemplarily illustrated in FIG. 11, where it can be noticed that the supply voltage Vcc is delivered to the motor in the form of a substantially square-wave voltage, i.e. in a sequence of on-off cycles of the power supply to the motor following each other in time, so as to bring about a variation pattern of the effective rotation speed such as symbolically represented in FIG. 9.

Figure 12:
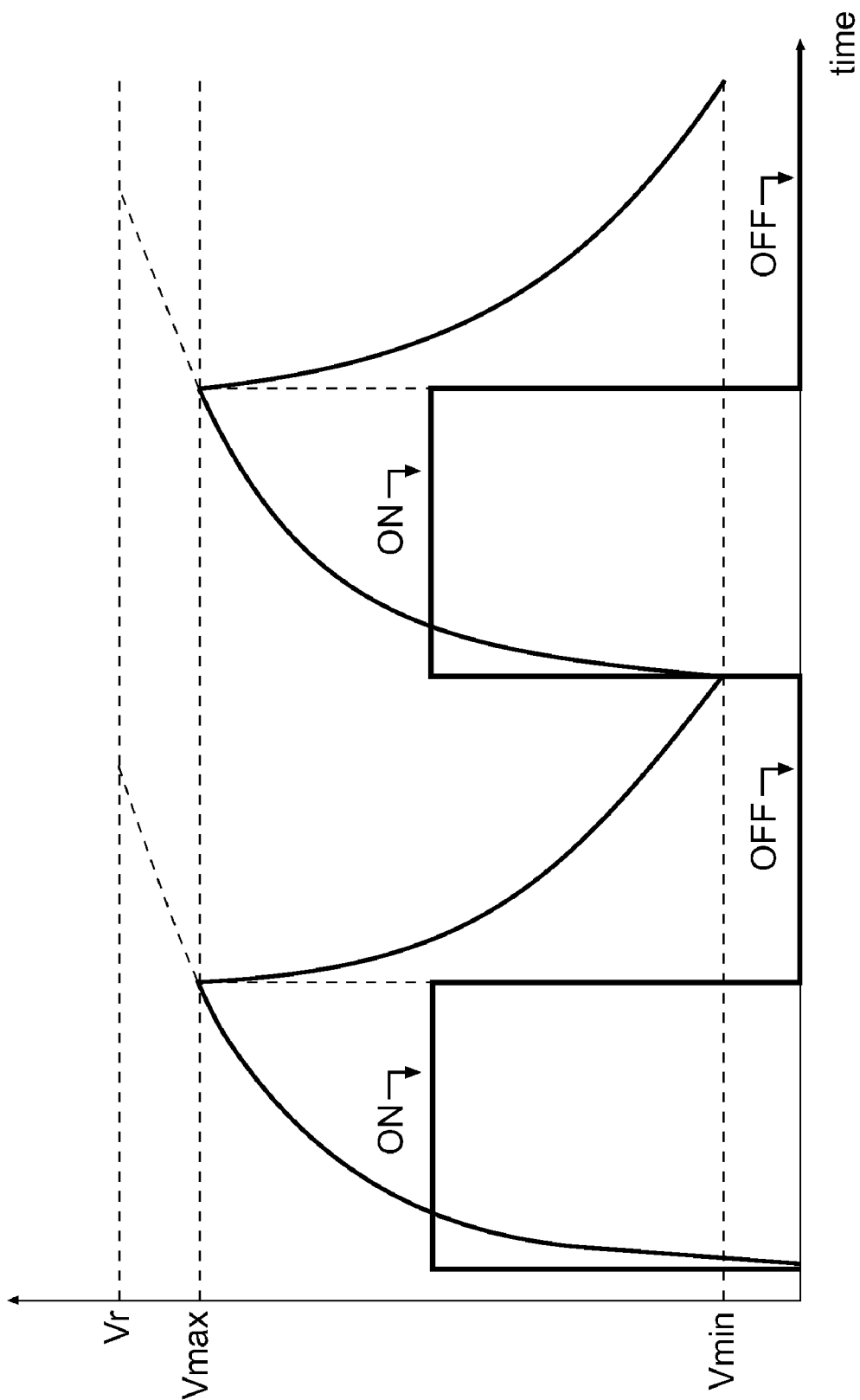
FIG. 12 is a symbolical and simplified representation of the rotating speed of the motor and said related power supply pattern according to the invention, as superposed on a same time scale.

3) A further improvement consists in that said supply voltage:

is not interrupted, i.e. switched off when the rotation speed of the shaft reaches sensibly up to the steady-state value thereof, since the same rotation speed of the shaft would turn out as being sensibly constant during the final part of said rotation cycle, and this would obviously be instrumental to a reduction in the generation of harmonic stresses, but is rather interrupted (end of the ON-portion of the cycle) when the rotation speed of the shaft reaches up to 95% of the maximum steady-state speed value Vr (see FIG. 12); this characteristic may most obviously be achieved with the aid of an appropriate and pre-determined timed adjustment of the control members of the same power supply or, by the way, with the use of other control means and modes as they are generally known as such in the art; in this connection, FIG. 12 shows a clear superposition of the supply voltage and the instant rotation speed of the shaft, according to the present invention.

4) A similar improvement is also obtained as far as the OFF portion of the cycle is concerned; during the phase of decreasing speed of rotation of the shaft, i.e. when the power supply to the motor is OFF, the same power supply to the motor is restored, i.e. switched ON again when said speed of rotation of the unbalancing shaft is reduced to just 5 percent of the maximum steady-state value of the same speed; this improvement is based on the fact that during the final portion of the OFF cycle, the stress being imparted by the motor is quite modest and, as a result, practically ineffective, so that the result would otherwise be the one of wasting valuable time to no avail at all, i.e. without any practical advantage in terms of overall performance.

5) Another improvement consists in reducing the duration of the elementary ON-OFF cycle to a rather low value, in view of allowing for as high as possible a number of ON-OFF cycles to be performed within a short period of time, in a way that is of course compatible and consistent with the above-described features.

In this connection, it has been found and noticed that, with a steady-state rotation speed situated anywhere between 5700 and 6000 rpm, the complete duration of each single ON-OFF cycle should therefore be kept within a limit of 1.0 second (i.e. 0.5 sec. ON—0.5 sec. OFF).

Figure 13:
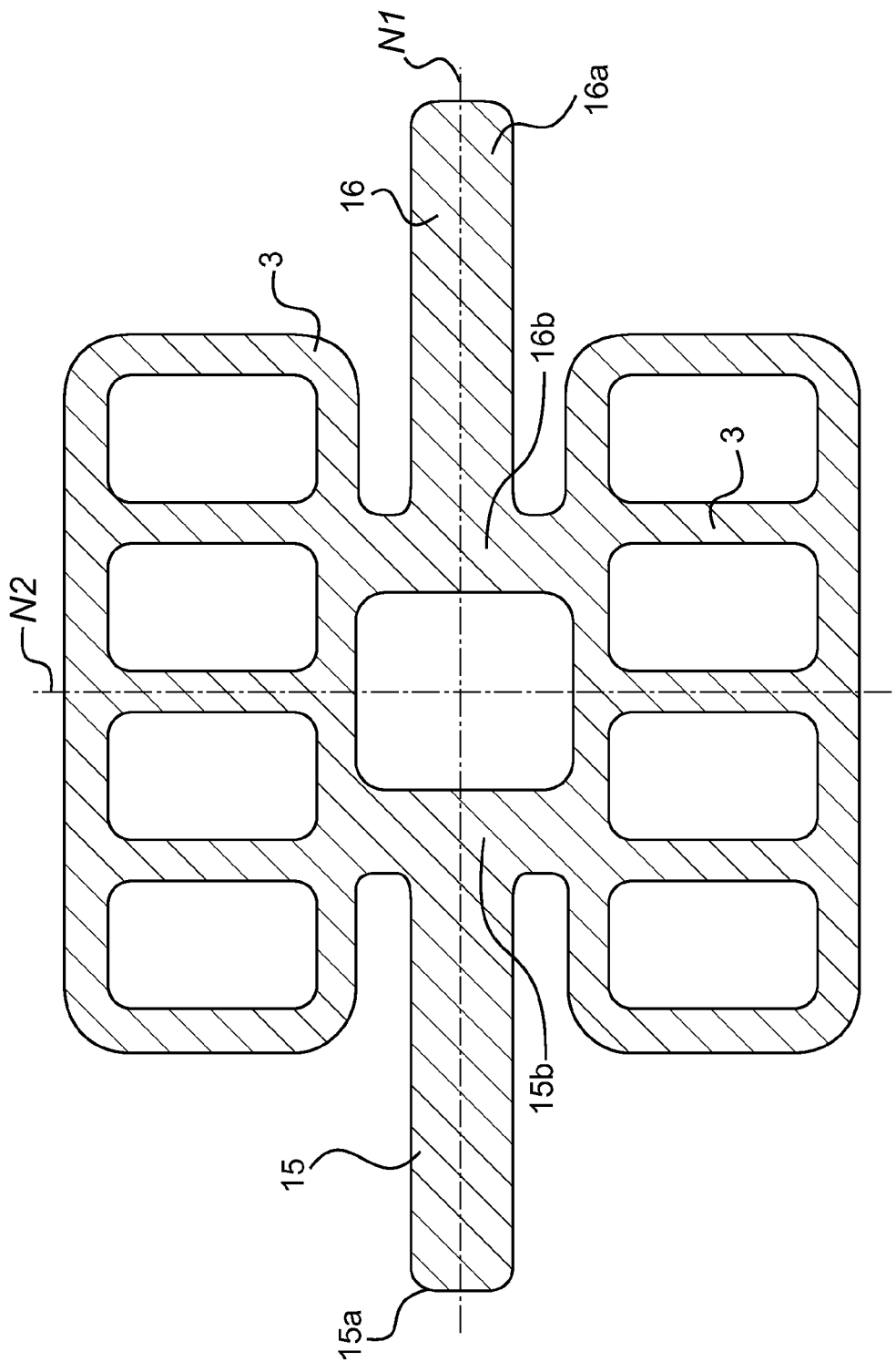
FIG. 13 is a view of an improved embodiment of a filter plate according to the present invention.

6) With reference to FIG. 13 now, a further improvement is achieved by giving said planar structure 3 a particular conformation, in that such structure is only partially similar to prior-art structures being currently used to such purpose in this particular application, in the sense that it still features solid surfaces alternating with void, i.e. hollow surfaces. However, forming said planar structure in this particular case calls for at least two planar surfaces 15, 16 to be arranged so as to extend longitudinally, and be connected with a respective side 15B, 16B thereof to the remaining portion of the body of the structure 3, whereas the respective opposite sides 15A, 15B thereof remain free, i.e. are not connected to any other portion of the same planar structure 3, but are merely in a surface contact with the underlying filter plate 1, i.e. are simply resting thereupon.

Figure 14:
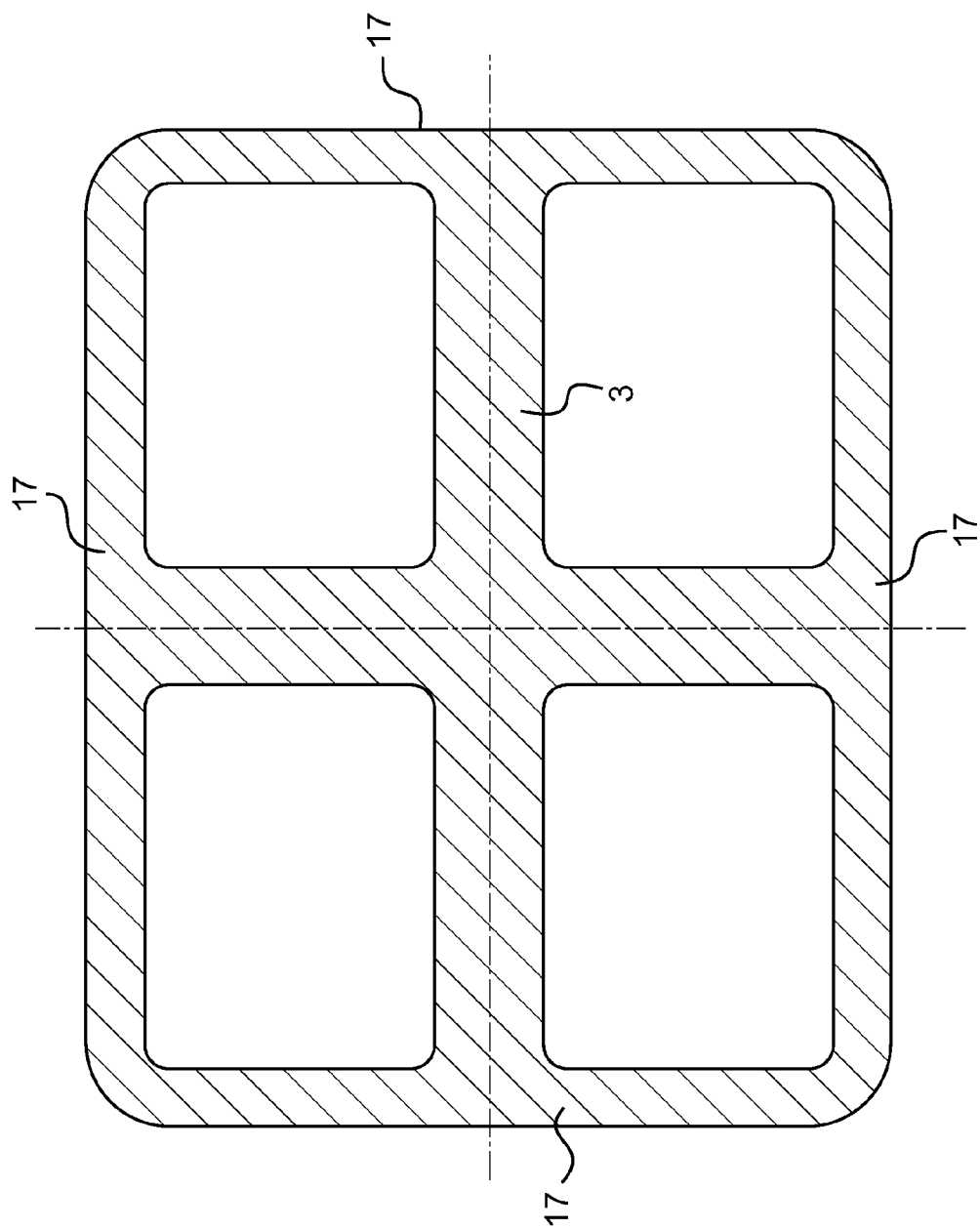
FIG. 14 is another view of an embodiment of the filter plate according to the state of the art.

This solution differs from the one that is generally known in the art, as represented in FIG. 14, in which all surfaces of the structure 3 are secured at both respective ends thereof, and said planar structure is closed by a peripheral ring 17; it has in fact been found experimentally that the proposed solution illustrated in FIG. 13 is such as to ensure improved performance in terms of flexibility and elasticity, thereby allowing for both more effective transmission of mechanical stresses from the motor to said elementary portions 1a, 1b, 1c . . . , and a broader amplitude of oscillation of the various surfaces 15, 16, which, owing to them being free at a respective end thereof, are not restrained by said planar and peripherally closed structure, as this occurs in the prior art, actually.

Figure 4:
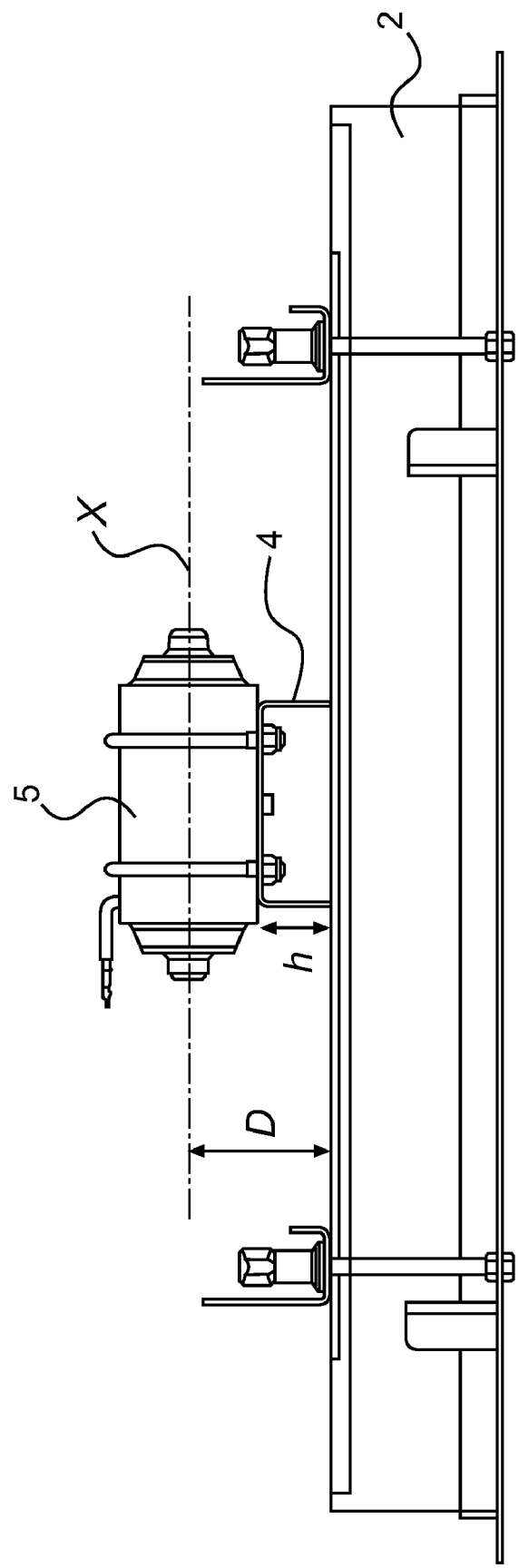
FIG. 4 is a side planar view of the filter means shown in the two preceding Figures.
Figure 5:
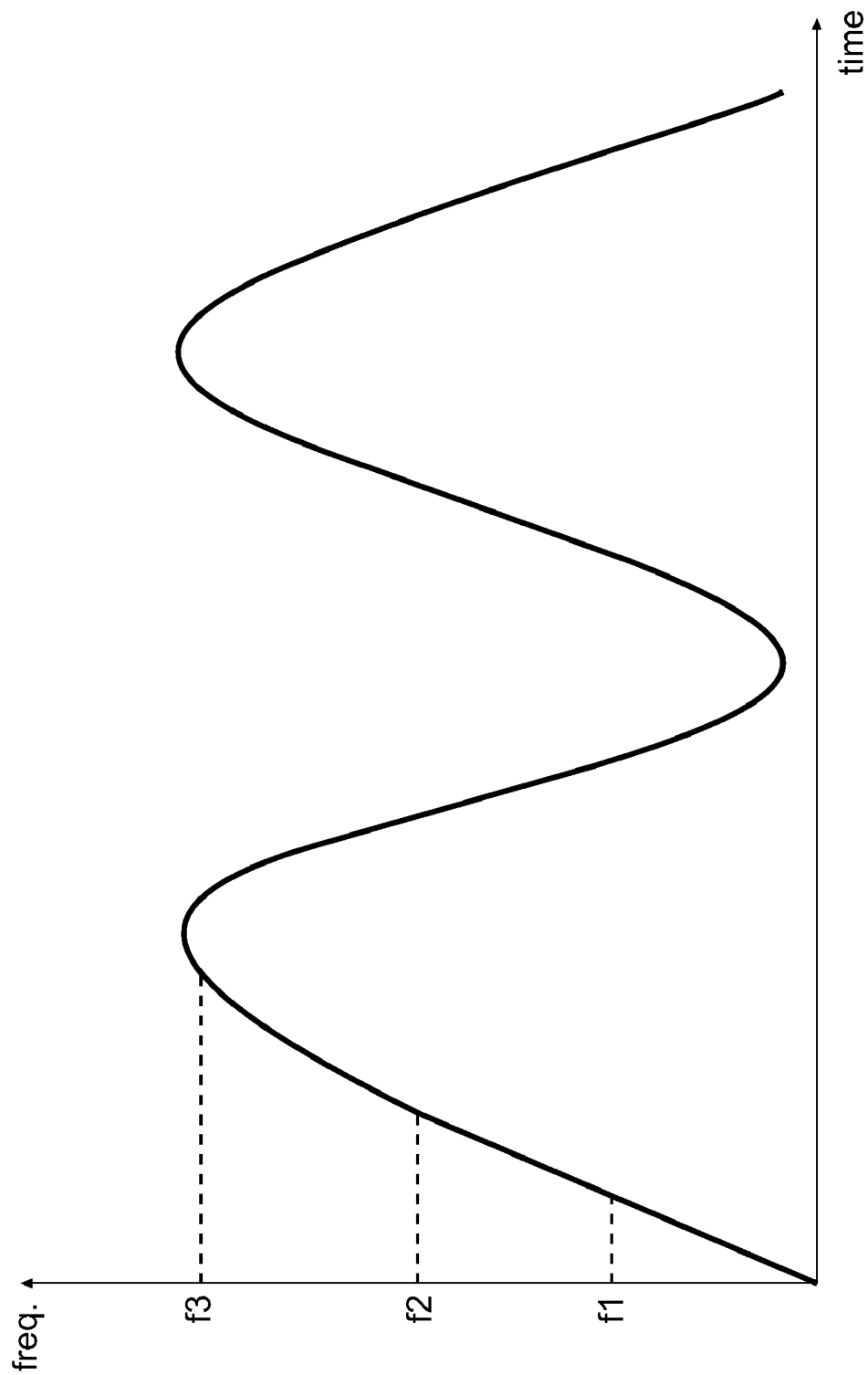
FIG. 5 is a symbolical, diagrammatical representation of an operative mode of the filter means according to the present invention.

7) A further advantageous improvement is obtained as follows: with reference to FIGS. 4 and 7, provisions are taken so that the distance D between the axis of rotation X of the motor shaft and said planar structure 3 (lying on a plane p), and which is equal to the sum of the radius r of the motor 5 relative to the outer structure thereof and the height h of said support socle 4, which said motor is resting on and fixed to, is such as to allow for a free oscillation frequency of the rigid assembly, as made up by said socle 4 and said motor 5, relative to said planar structure 3, which is comprised within the range of the rotation frequencies of the motor, i.e. between said Vmin and Vmax values of the motor speed.

Figure 7:
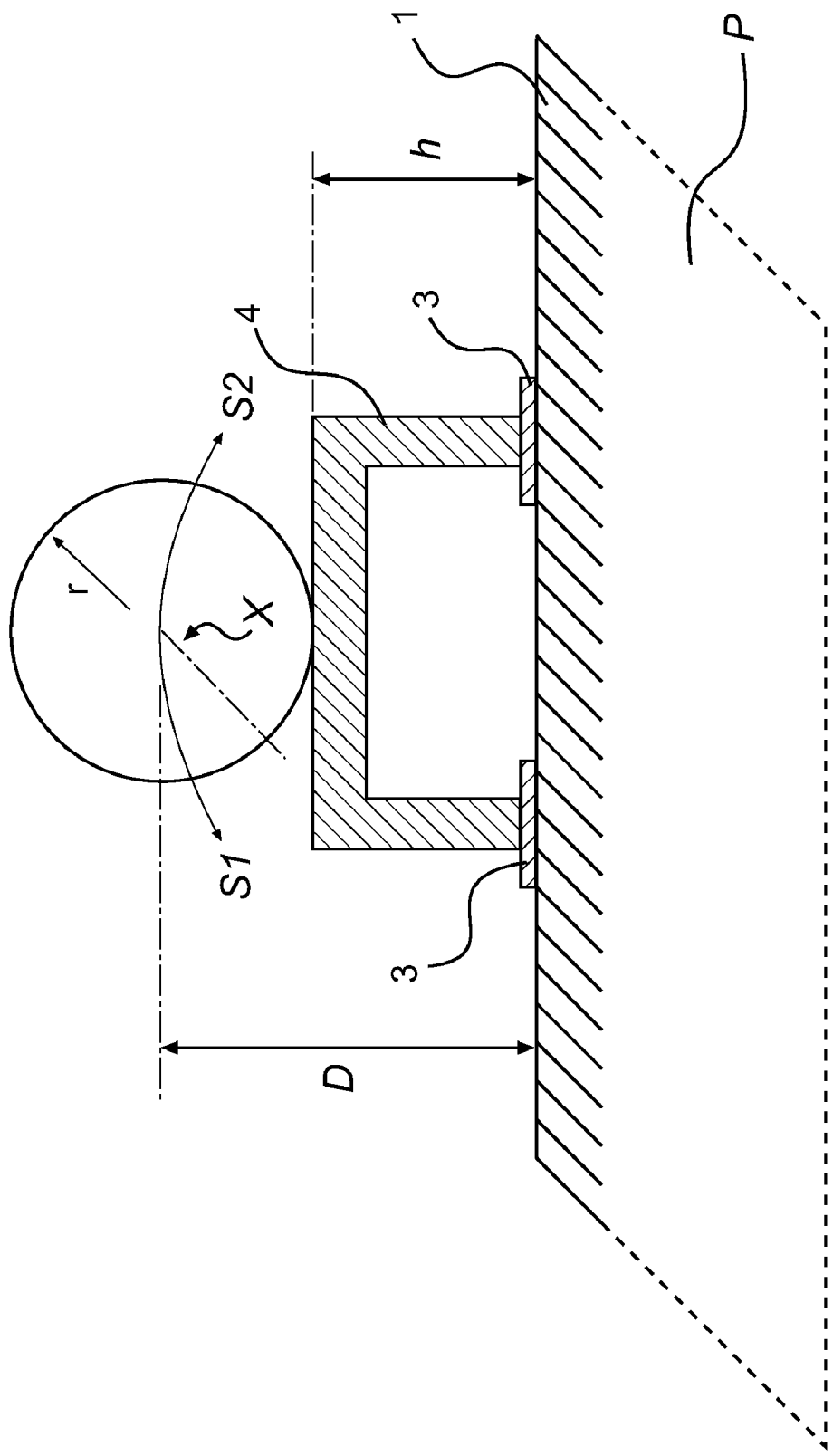
FIG. 7 is a symbolical, diagrammatical representation of a specific additional operative mode for shaking a filter means according to the present invention.

It will of course be appreciated that, with reference to FIG. 7, this free oscillation must take place with a motion that covers the two opposite arcs S1 and S2 extending on both sides of a middle resting position thereof; in other words, said free oscillation of said rigid assembly occurs on a plane that is orthogonal to said axis X of the motor 5.

The circumstance then arises in which, during the runup part of the rotor speed curve of the motor, the same rotor attains a rotation frequency that is equal to the natural free oscillation frequency, or eigenfrequency, of said motor-socle assembly, so that said motor-socle assembly, owing to its being affected by a stress whose frequency is equal to the natural free oscillation frequency thereof, will in this condition start to resonate, thereby generating a further significant stress that is again passed on to said filter plate 1 via said planar structure 3.

Therefore, the ultimate result of such effect is that said filter plate is stressed in a vibratory mode to a further extent, thereby enhancing the effectiveness of the cleaning action of the inventive arrangement to a still further extent.

8) Finally, another improvement is quite easily attained if the support structure 3 is provided in a form that is substantially symmetrical relative to a plane extending orthogonally to said filter plate 1; referring again to FIG. 13, which exemplarily illustrates a preferred embodiment of such structure 3, the latter can be noticed to be perfectly symmetrical according to two planes N1 and N2 which are orthogonal relative to each other, and are orthogonal also relative to the plane of the filter plate 1. With a conformation of this kind of the structure 3, it therefore turns out as being obvious and, of course, more effective in view of a well-balanced, smooth and uniform operation of the filtering means, if the electric motor 5 is applied—with the aid of said support socle 4, of course—on to a region sited on a plane of symmetry of said structure 3.

The invention claimed is:

1. A filter device for filtering out impurities contained in a stream of gas flowing through the filter device, the filter device comprising:
an inner filter plate;
an outer frame that houses said filter plate therewithin;
a structure for retaining and supporting said filter plate, and for conveying shaking motion thereto, said structure being arranged on a face of said filter plate;
a device for shaking and vibrating said structure, the device including
a support base disposed on said structure,
a rotary electric motor including a rotor provided with one or more unbalanced masses, the electric motor being fixedly mounted on said support base; and
a control device for controlling a power supply of said electric motor in an ON-OFF cycling pattern,
wherein said control device controls the power supply to said electric motor to be a direct-current supply voltage switched in an ON-OFF mode supplied in the form of a substantially square-wave voltage in a sequence comprising a pre-determined number of ON-OFF cycles.

2. The filter device of claim 1, wherein said structure for retaining said filter plate is substantially planar and formed with at least two projecting portions projecting freely from a middle region of said structure in opposite directions, the respective outer sides of the projecting portions being free relative to any other portion of said structure.

3. The filter device of claim 1, wherein the complete operating cycle of said electric motor lasts approximately 1 second.

4. The filter device of claim 1, wherein said structure for retaining said filter plate is substantially planar and formed with at least two projecting portions projecting freely from a middle region of said structure in opposite directions, the respective outer sides of the projecting portions being free relative to any other portion of said structure.

5. The filter device of claim 1, wherein said structure is symmetrical, and wherein said electric motor is disposed on a portion of said structure which is substantially positioned on a plane of symmetry thereof.

6. A floor cleaning and sweeping machine for filtering a flow of air being taken in by suction, the machine comprising a filter device for filtering out impurities contained in a stream of gas flowing through the filter device, the filter device comprising:
an inner filter plate;
an outer frame that houses said filter plate therewithin;
a structure for retaining and supporting said filter plate, and for conveying shaking motion thereto, said structure being arranged on a face of said filter plate;
a device for shaking and vibrating said structure, the device including
a support base disposed on said structure,
a rotary electric motor including a rotor provided with one or more unbalanced masses, the electric motor being fixedly mounted on said support base; and a control device for controlling a power supply of said electric motor in an ON-OFF cycling pattern, wherein said control device controls the power supply to said electric motor to be a direct-current supply voltage switched in an ON-OFF mode supplied in the form of a substantially square-wave voltage in a sequence comprising a pre-determined number of ON-OFF cycles.

7. Filter means according to claim 6, wherein the complete operating cycle of said electric motor lasts approximately 1 second.

8. The filter device of claim 6, wherein said structure for retaining said filter plate is substantially planar and formed with at least two projecting portions projecting freely from a middle region of said structure in opposite directions, the respective outer sides of the projecting portions being free relative to any other portion of said structure.

9. The filter device of claim 6, wherein said structure is symmetrical, and wherein said electric motor is disposed on a portion of said structure which is substantially positioned on a plane of symmetry thereof.

* * * * *